(12) United States Patent  (10) Patent No.: US 8,773,059 B2
Juan et al.  (45) Date of Patent: Jul. 8, 2014

(54) CONTROLLER CHIP WITH SIGNAL SWAPPING CAPABILITY FOR CONTROLLING MOTOR DEVICE AND RELATED METHOD THEREOF

(75) Inventors: Kuan-Kai Juan, Hsinchu County (TW); Yen-Lin Chen, New Taipei (TW); Chih-Lung Tai, Taipei (TW); Hao-Hui Yin, Hsinchu (TW); Hung-Yen Chen, Taipei (TW); Chih-Chuan Chen, New Taipei (TW); Hung-I Chen, Kaohsiung (TW); Ming-Jiou Yu, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 574 days.

(21) Appl. No.: 13/073,982

(22) Filed: Mar. 28, 2011

(65) Prior Publication Data

US 2012/0249040 A1  Oct. 4, 2012

(51) Int. Cl.
*H02P 1/00* (2006.01)
(52) U.S. Cl.
USPC .................. 318/494; 318/567; 318/568.1
(58) Field of Classification Search
USPC ............... 318/494, 567, 568.1; 388/828, 829
See application file for complete search history.

(56) References Cited

U.S. PATENT DOCUMENTS

| 7,309,967 B2 | 12/2007 | Moser |
| 7,667,419 B2 | 2/2010 | Fukamizu |
| 7,800,425 B2 | 9/2010 | Tang |
| 2003/0071593 A1* | 4/2003 | Pedrazzini et al. ........... 318/567 |
| 2008/0084241 A1 | 4/2008 | Yamamoto |

FOREIGN PATENT DOCUMENTS

| CN | 1276561 A | 12/2000 |
| CN | 1677538 A | 10/2005 |
| CN | 101131824 A | 2/2008 |
| EP | 1 037 373 A2 | 9/2000 |
| EP | 1 043 662 B1 | 7/2002 |
| TW | 200823477 | 6/2008 |

* cited by examiner

*Primary Examiner* — Karen Masih
(74) *Attorney, Agent, or Firm* — Winston Hsu; Scott Margo

(57) ABSTRACT

A controller chip for controlling a motor device includes a first input port, a first output port, a controller, and a signal processing circuit. The first input port is arranged to receive a motor control input. The first output port is arranged to generate a motor control output. The controller is arranged to generate an output signal according to an input signal, and has a second input port for receiving the input signal and a second output port for outputting the output signal. The input signal is derived from the motor control input, and the motor control output is derived from the output signal. The signal processing circuit has a target interconnection configuration selected from a plurality of candidate interconnection configurations each including an interconnection between the first input port and the second input port and an interconnection between the first output port and the second output port.

18 Claims, 12 Drawing Sheets

CONTROLLER CHIP WITH SIGNAL SWAPPING CAPABILITY FOR CONTROLLING MOTOR DEVICE AND RELATED METHOD THEREOF

BACKGROUND

The disclosed embodiments of the present invention relate to driving a motor device, and more particularly, to a controller chip with signal swapping capability for controlling a motor device and related method thereof.

Motor devices are widely used in a variety of electronic apparatuses. A controller chip is therefore designed to control the operation of a motor device. However, different manufactures of motor devices may have different definitions of the signal inputs, and different manufactures of controller chips may have different definitions of signal outputs. For example, a motor device may operate under the control of a differential input signal pair including a positive control signal and a negative control signal. Therefore, a controller chip is required to have a first pin intended for outputting the positive control signal and a second pin intended for outputting the negative control signal. In a case where the definition of signal outputs of the controller chip is consistent with the definition of the signal inputs of the motor device, the motor device would rotate in a correct rotational direction as desired. However, in another case where the definition of signal outputs of the controller chip is inconsistent with the definition of the signal inputs of the motor device, the motor device would not rotate in a correct rotational direction due to an incorrect polarity setting of the control signals. One conventional solution is to apply jumpers to a printed circuit board (PCB) for adequately modifying the wiring between the controller chip and the motor device. Another conventional design is to redesign the PCB layout for transmitting motor control signals with the correct polarity setting to the motor device.

The above-mentioned solutions require complicated modifications made to signal traces of the PCB and are by no means cost-effective. Thus, there is a need for an innovative controller chip design which can easily change the polarity setting of control signals sent to the motor device and thus requires no additional modification made to the signal traces routed on the PCB.

SUMMARY

In accordance with exemplary embodiments of the present invention, a controller chip with signal swapping capability for controlling a motor device and related method thereof are proposed to solve the above-mentioned problem.

According to a first aspect of the present invention, an exemplary controller chip for controlling a motor device is disclosed. The exemplary controller chip includes a first input port, a first output port, a controller, and a signal processing circuit. The first input port is arranged to receive a motor control input. The first output port is arranged to generate a motor control output. The controller is arranged to generate an output signal according to an input signal, and has a second input port for receiving the input signal and a second output port for outputting the output signal. The input signal is derived from the motor control input, and the motor control output is derived from the output signal. The signal processing circuit is arranged to have a target interconnection configuration selected from a plurality of candidate interconnection configurations each including an interconnection between the first input port and the second input port and an interconnection between the first output port and the second output port.

According to a second aspect of the present invention, an exemplary controller chip for controlling a motor device is disclosed. The exemplary controller chip includes a first input port, a first output port, a controller, and a signal processing circuit. The first input port is arranged to receive a motor control input. The first output port is arranged to generate a motor control output. The controller is arranged to generate an output signal according to an input signal, and has a second input port for receiving the input signal and a second output port for outputting the output signal. The input signal is derived from the motor control input, and the motor control output is derived from the output signal. The signal processing circuit is arranged to switch from a first interconnection configuration to a second interconnection configuration, wherein each of the first interconnection configuration and the second interconnection configuration includes an interconnection between the first input port and the second input port and an interconnection between the first output port and the second output port.

According to a third aspect of the present invention, an exemplary method of controlling a motor device is disclosed. The exemplary method includes the following steps: reading a control setting of a pin assignment of a controller chip; adjusting the pin assignment of the controller chip according to the control setting; and generating a motor control output to the motor device by utilizing the controller chip with the adjusted pin assignment.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
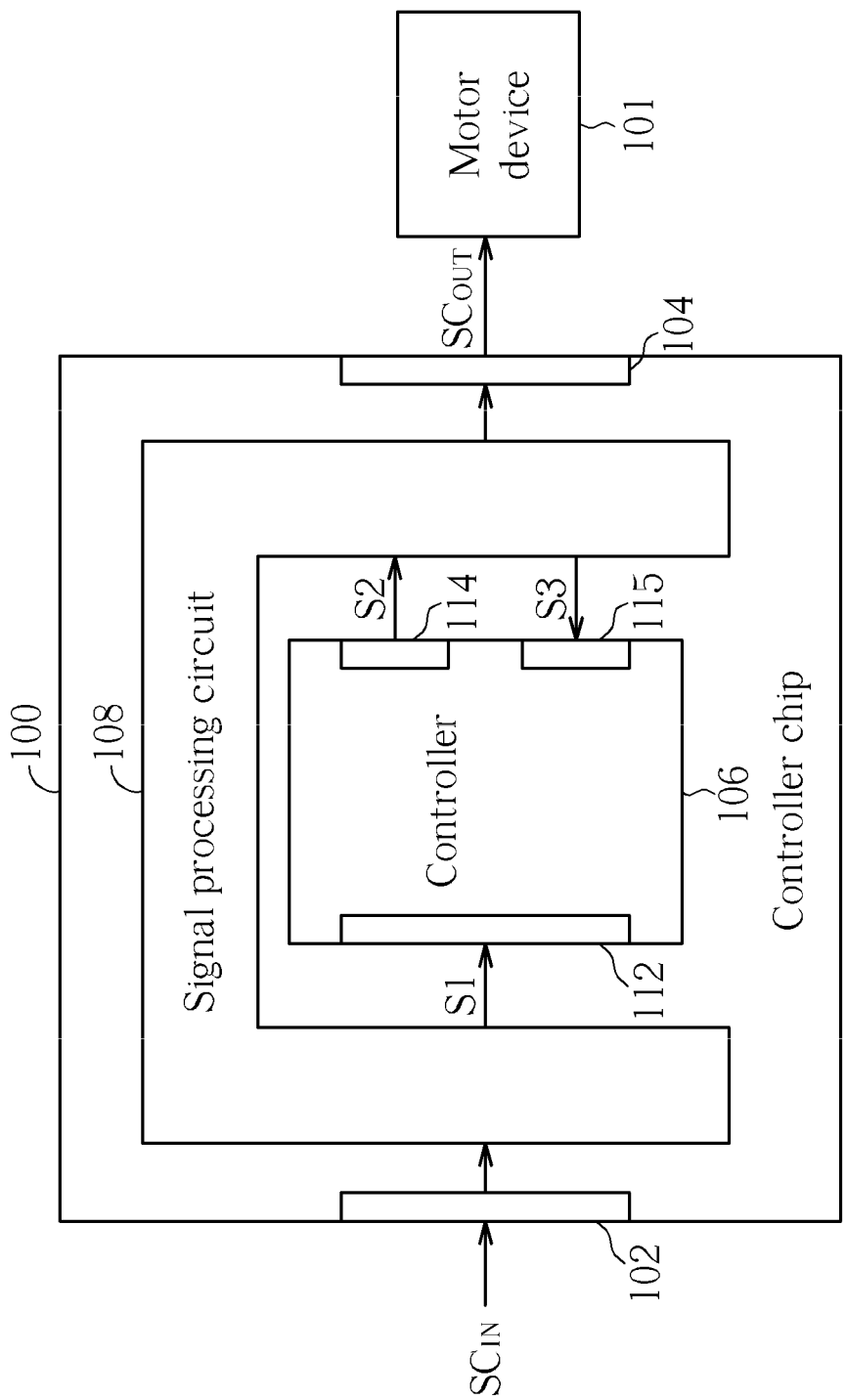
FIG. 1 is a diagram illustrating a generalized structure of a controller chip according to the present invention.

FIG. 1 is a diagram illustrating a generalized structure of a controller chip according to the present invention. The controller chip 100 is used for controlling a motor device, such as a focus actuator, a tracking actuator, a tilt actuator, a stepping motor, or a spindle motor employed in the optical storage apparatus (e.g., an optical disc drive). For example, the controller chip 100 is part of a tracking control mechanism having the tracking actuator included therein, a focus control mechanism having the focus actuator included therein, a tilt compensation mechanism having the tilt actuator included therein, a sled movement control system having the stepping motor included therein, and/or a disc rotation control mechanism having the spindle motor included therein. As shown in FIG. 1, the controller chip 100 includes, but is not limited to, a first input port 102, a first output port 104, a controller 106, and a signal processing circuit 108. Regarding the controller 106, it has a second input port 112, a second output port 114, and an optional third input port 115. The first input port 102 of the controller chip 100 is arranged to receive a motor control input $SC_{IN}$. The first output port 104 of the controller chip 100 is arranged to generate a motor control output $SC_{OUT}$ to an external motor device 101. It should be noted that each of the first input port 102 and the first output port 104 may include a plurality of pins for signal transmission. That is, the motor control input $SC_{IN}$ may include a plurality of input signals, and the motor control output $SC_{OUT}$ may include a plurality of output signals having a particular polarity setting.

The controller 106 is arranged to generate an output signal S2 according to an input signal S1. Specifically, the second input port 112 is for receiving the input signal S1, and the second output port 114 is for outputting the output signal S2. If the controller chip 100 refers to the motor control input $SC_{IN}$ as well as a motor feedback input S3 for controlling the operation of the motor device 101, the optional third input port 115 of the controller 106 is therefore implemented for receiving a motor feedback input S3. For example, the motor feedback input S3 may be generated in response to the motor control output $SC_{OUT}$ sent to the motor device 101. However, if the controller chip 100 simply controls the operation of the motor device 101 according to the motor control input $SC_{IN}$, the optional third input port 115 may be omitted.

The input signal S1 is derived from the motor control input $SC_{IN}$, and the motor control output $SC_{OUT}$ is derived from the output signal S2. By way of example, but not limitation, each of the motor control output $SC_{OUT}$ and the output signal S2 is a differential signal pair including a positive output signal and a negative output signal. The polarity setting of the motor control output $SC_{OUT}$ may be properly controlled by the signal processing circuit 108 disposed in the controller chip 100. More specifically, the signal processing circuit 108 is arranged to have a target interconnection configuration selected from a plurality of candidate interconnection configurations each including an interconnection between the first input port 102 and the second input port 112, and an interconnection between the first output port 104 and the second output port 114. In other words, the signal processing circuit 108 is capable of switching from a first interconnection configuration to a second interconnection configuration, wherein each of the first interconnection configuration and the second interconnection configuration includes an interconnection between the first input port 102 and the second input port 112, and an interconnection between the first output port 104 and the second output port 114.

For better understanding of technical features of the controller chip 100, certain exemplary implementations of the controller chip 100 are discussed hereinafter.

Figure 2:
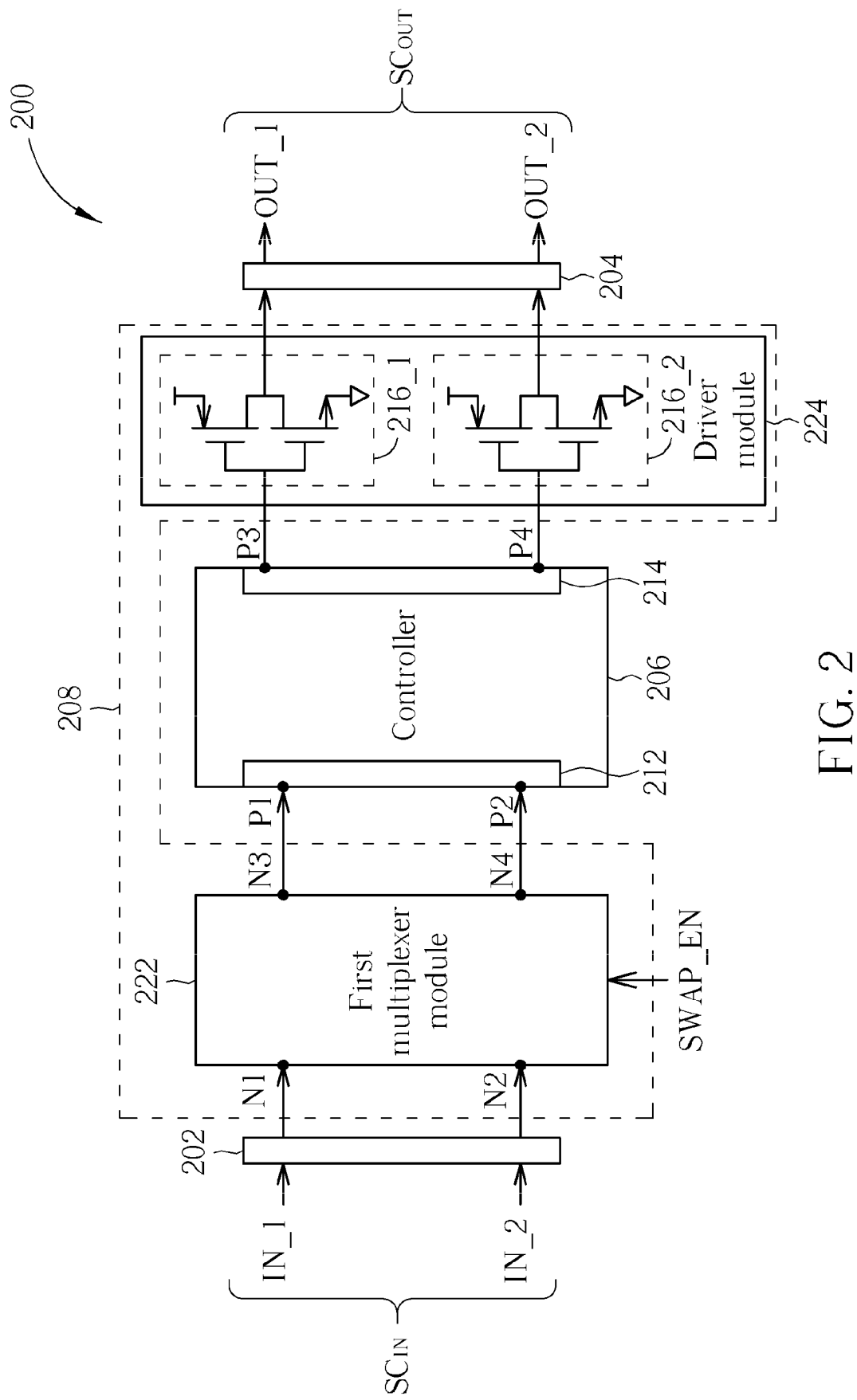
FIG. 2 is a diagram illustrating a first exemplary implementation of the controller chip shown in FIG. 1.

Please refer to FIG. 2, which is a diagram illustrating a first exemplary implementation of the controller chip 100 shown in FIG. 1. The controller chip 200 employs the same circuit structure as controller chip 100 shown in FIG. 1, and therefore includes a controller 206 which realizes the controller 106 and a signal processing circuit 208 which realizes the signal processing circuit 108. In this exemplary implementation, the signal processing circuit 208 includes a first multiplexer module 222 and a driver module 224. The driver module 224 has a plurality of driving units, such as a first driving unit 216_1 and a second driving unit 216_2, included therein. The first multiplexer module 222 is arranged to provide a plurality of candidate first interconnections between the first input port 202 of the controller chip 200 and the second input port 212 of the controller 206.

In this exemplary implementation, the first multiplexer module 222 includes a plurality of input nodes N1 and N2 and a plurality of output nodes N3 and N4. When the first multiplexer module 222 is controlled by a control setting SWAP_EN with a first logic level (e.g., "0") to have one candidate first interconnection, the input node N1 is electrically connected to the output node N3, and the other input node N2 is electrically connected to the other output node N4. When the first multiplexer module 222 is controlled by the control setting SWAP_EN with a second logic level (e.g., "1") to have another candidate first interconnection, the input node N1 is electrically connected to the output node N4, and the other input node N2 is electrically connected to the other output node N3. In other words, the first multiplexer module 222 performs signal swapping upon the motor control input $SC_{IN}$ under the control of the control setting SWAP_EN.

As shown in FIG. 2, the motor control input $SC_{IN}$ includes, but is not limited to, a first input signal IN_1 and a second input signal IN_2, and the motor control output $SC_{OUT}$ includes, but is not limited to, a first output signal OUT_1 and a second output signal OUT_1. For instance, the first input signal $IN_{-1}$ may be a focus servo output signal FOO, a tracking servo output signal TRO, a tilt compensation signal TLO, or a sled motor control signal FMO/FMO2, and the second input signal IN_2 may be a reference voltage. Thus, the first output signal OUT_1 and the second output signal OUT_1 may include FR+ and FR− generated in response to the focus servo output signal FOO, TR+ and TR− generated in response to the tracking servo output signal TRO, TL+ and TL− generated in response to the tilt compensation signal TLO, SLED1+ and SLED1− generated in response to one sled motor control signal FMO, or SLED2+ and SLED2− generated in response to the other sled motor control signal FMO2.

When the control setting SWAP_EN has the first logic level (e.g., "0"), the first input signal IN_1 is fed into an input node P1 of the second input port 212, and the second input signal IN_2 is fed into the other input node P2 of the second input port 212. Next, the driver module 224 generates the motor control output $SC_{OUT}$, including the first output signal OUT_1 and the second output signal OUT_2, according to the signals at the output nodes P3 and P4 of the second output port 214.

More specifically, an output of the first driving unit 216_1 acts as the first output signal OUT_1, and an output of the second driving unit 216_2 acts as the second output signal OUT_2. Thus, the motor control output $SC_{OUT}$ would have a first polarity setting. When the control setting SWAP_EN has the second logic level (e.g., "1"), the first input signal IN_1 is fed into the input node P2 of the second input port 212, and the second input signal IN_2 is fed into the other input node P1 of the second input port 212. Next, the driver module 224 generates the motor control output $SC_{OUT}$, including first output signal OUT_1 and the second output signal OUT_2, according to the swapped signals at the output nodes P3 and P4 of the second output port 214. Thus, the motor control output $SC_{OUT}$ would have a second polarity setting that is different from the first polarity setting. To put it simply, with the control setting SWAP_EN properly set, the signal processing circuit 208 shown in FIG. 2 has a target interconnection configuration includes a target interconnection selected from the candidate first interconnections provided by the first multiplexer module 222. Thus, by simply controlling the first multiplexer module 222 inside the controller chip 200, the polarity definition of signal outputs of the controller chip 200 can be easily configured to be consistent with the polarity definition of signal inputs of the motor device to be controlled.

Figure 3:
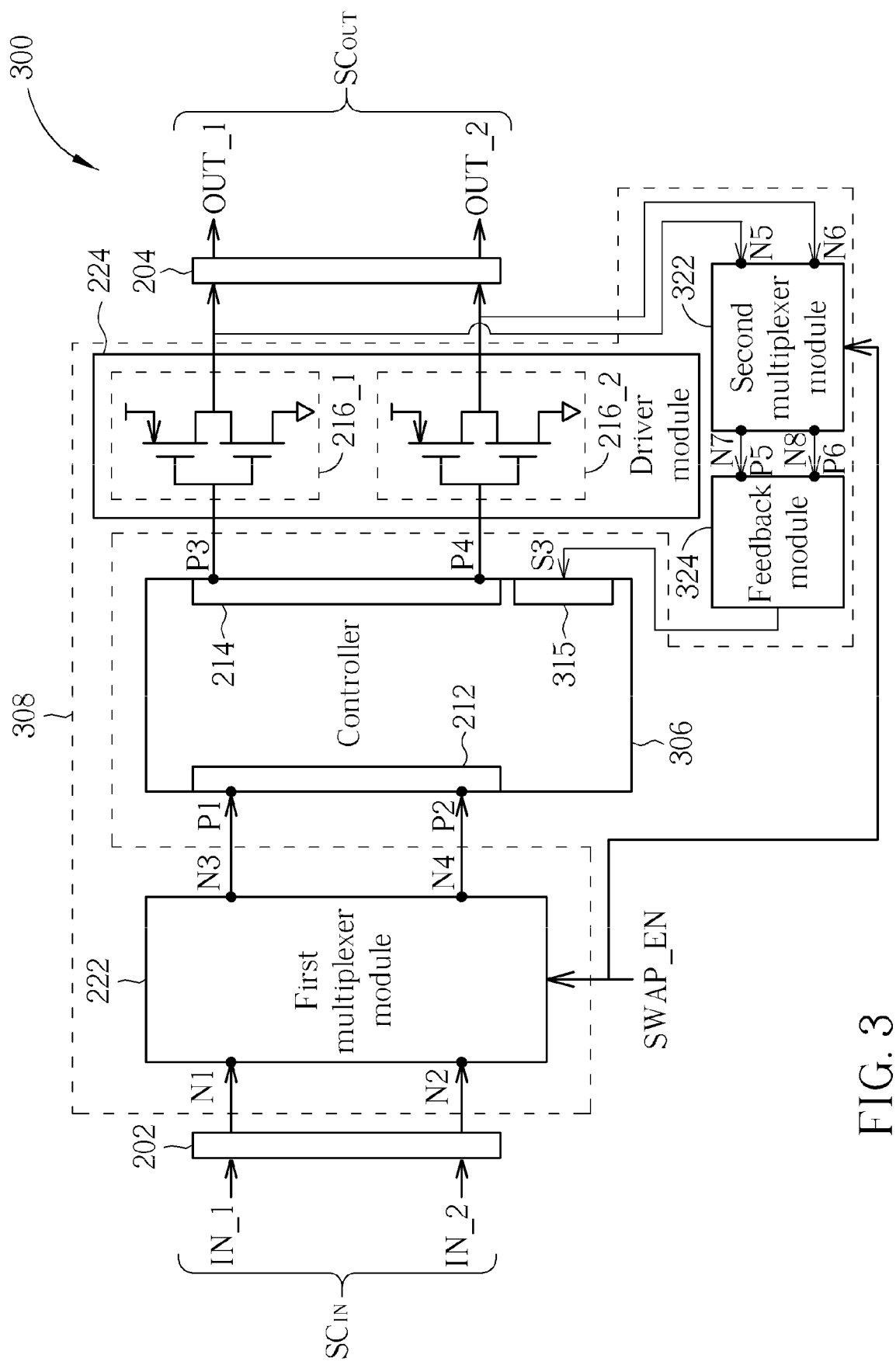
FIG. 3 is a diagram illustrating a second exemplary implementation of the controller chip shown in FIG. 1.

As mentioned above, it is possible that the controller chip may refer to the motor control input $SC_{IN}$ as well as the motor feedback input S3 of FIG. 1 for controlling the operation of the motor device. Thus, the feedback path should also be designed to support a plurality of candidate interconnections. FIG. 3 is a diagram illustrating a second exemplary implementation of the controller chip 100 shown in FIG. 1. The structure of the controller chip 300 shown in FIG. 3 is similar to that of the controller chip 200 shown in FIG. 2. The major difference between them is that the signal processing circuit 308 further includes a second multiplexer 322 and a feedback module 324 coupled to a third input port 315 of the controller chip 306. The feedback module 324 is arranged to generate the motor feedback input S3 according to the motor control output $SC_{OUT}$. Regarding the second multiplexer module 322, it is arranged to provide a plurality of candidate second interconnections between the feedback module 324 and the first output port 204.

In this exemplary implementation, the second multiplexer module 322 includes a plurality of input nodes N5 and N6 and a plurality of output nodes N7 and N8. When the second multiplexer module 322 is controlled by the control setting SWAP_EN with the first logic level (e.g., "0") to have one candidate second interconnection, the input node N5 is electrically connected to the output node N7, and the other input node N6 is electrically connected to the other output node N8. When the second multiplexer module 322 is controlled by the control setting SWAP_EN with the second logic level (e.g., "1") to have another candidate second interconnection, the input node N5 is electrically connected to the output node N8, and the other input node N6 is electrically connected to the other output node N7. In other words, the second multiplexer module 322 performs signal swapping upon the motor control output $SC_{OUT}$ under the control of the control setting SWAP_EN.

When the control setting SWAP_EN has the first logic level (e.g., "0"), the first output signal OUT_1 is fed into an input node P5 of the feedback module 324, and the second output signal OUT_2 is fed into the other input node P6 of the feedback module 324. Next, the feedback module 324 generates the motor feedback input S3 according to the received signals having the first polarity setting. When the control setting SWAP_EN has the second logic level (e.g., "1"), the first output signal OUT_1 is fed into the input node P6 of the feedback module 324, and the second output signal OUT_2 is fed into the other input node P5 of the feedback module 324. Next, the feedback module 324 generates the motor feedback input S3 according to the swapped signals having the second polarity setting which is different from the first polarity setting. To put it simply, with the control setting SWAP_EN properly set, the signal processing circuit 308 shown in FIG. 3 has a target interconnection configuration includes a target interconnection selected from the candidate first interconnections provided by the first multiplexer module 222, and a target interconnection selected from the candidate second interconnections provided by the second multiplexer module 322.

Figure 4:
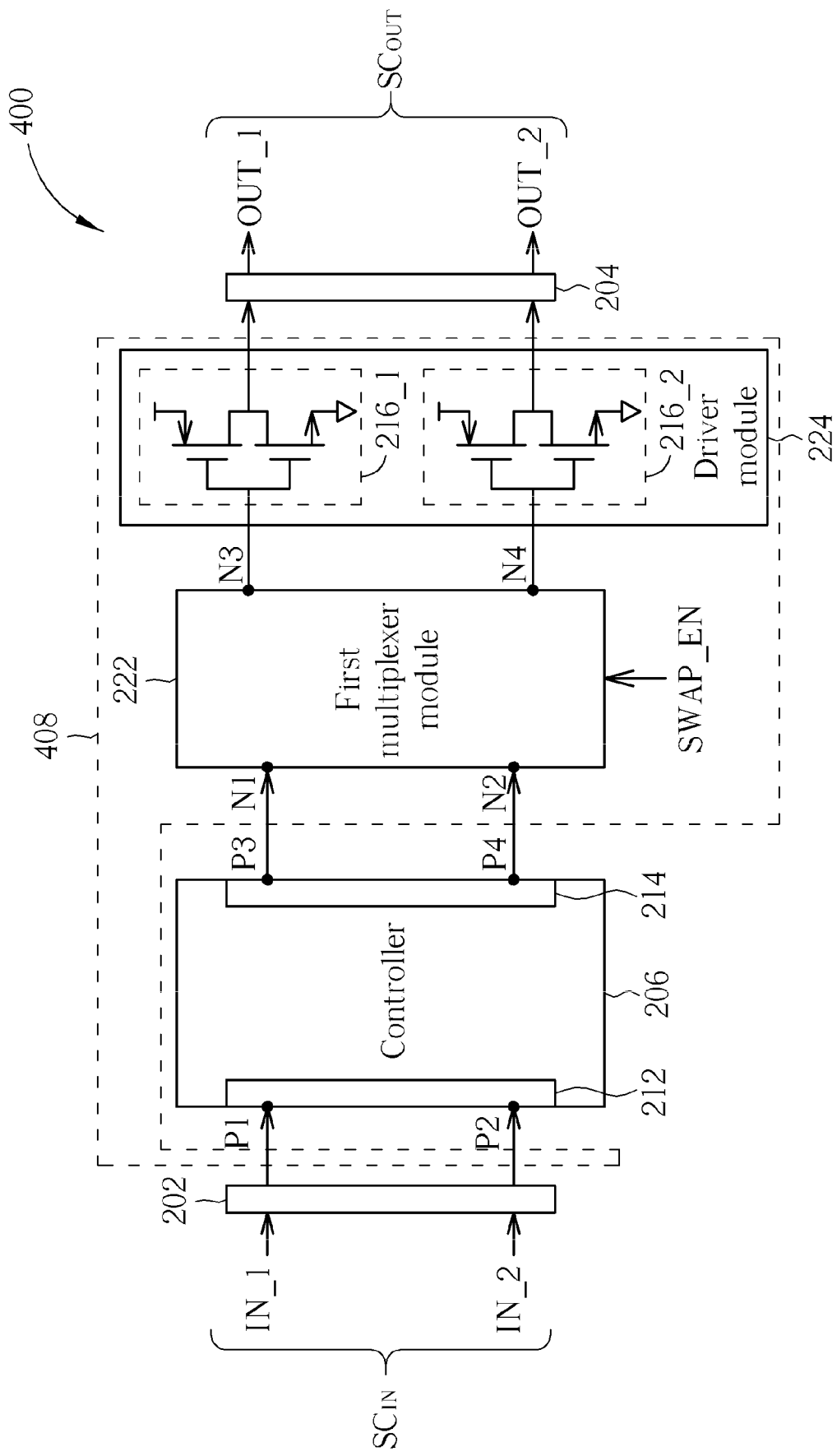
FIG. 4 is a diagram illustrating a third exemplary implementation of the controller chip shown in FIG. 1.

Please refer to FIG. 4, which is a diagram illustrating a third exemplary implementation of the controller chip 100 shown in FIG. 1. The difference between the controller chip 400 shown in FIG. 4 and the controller chip 200 shown in FIG. 2 is the signal processing circuit design. As shown in FIG. 4, the signal processing circuit 408 has the first multiplexer module 222 disposed between the controller 206 and the driver module 224. Therefore, the first input signal IN_1 of the motor control input $SC_{IN}$ is fed into the input node P1 of the second input port 212, and the second input signal IN_2 of the motor control input $SC_{IN}$ is fed into the input node P2 of the second input port 212. The first multiplexer module 222 is arranged to provide a plurality of candidate first interconnections between the second output port 214 and the driver module 224. When the first multiplexer module 222 is controlled by the control setting SWAP_EN with the first logic level (e.g., "0") to have one candidate first interconnection, the input node N1 is electrically connected to the output node N3, and the other input node N2 is electrically connected to the other output node N4. When the first multiplexer module 222 is controlled by the control setting SWAP_EN with the second logic level (e.g., "1") to have another candidate first interconnection, the input node N1 is electrically connected to the output node N4, and the other input node N2 is electrically connected to the other output node N3. Thus, the motor control output $SC_{OUT}$ would have a first polarity setting for the first output signal OUT_1 and the second output signal OUT_2 included therein when the control setting SWAP_EN has the first logic level (e.g., "0"), and would have a second polarity setting for the first output signal OUT_1 and the second output signal OUT_2 included therein when the control setting SWAP_EN has the second logic level (e.g., "1").

To put it simply, with the control setting SWAP_EN properly set, the signal processing circuit 408 shown in FIG. 4 has a target interconnection configuration includes a target interconnection selected from the candidate first interconnections provided by the first multiplexer module 222. Thus, by simply controlling the first multiplexer module 222 inside the controller chip 400, the polarity definition of signal outputs of the controller chip 400 can be easily configured to be consistent with the polarity definition of signal inputs of the motor device to be controlled.

Figure 5:
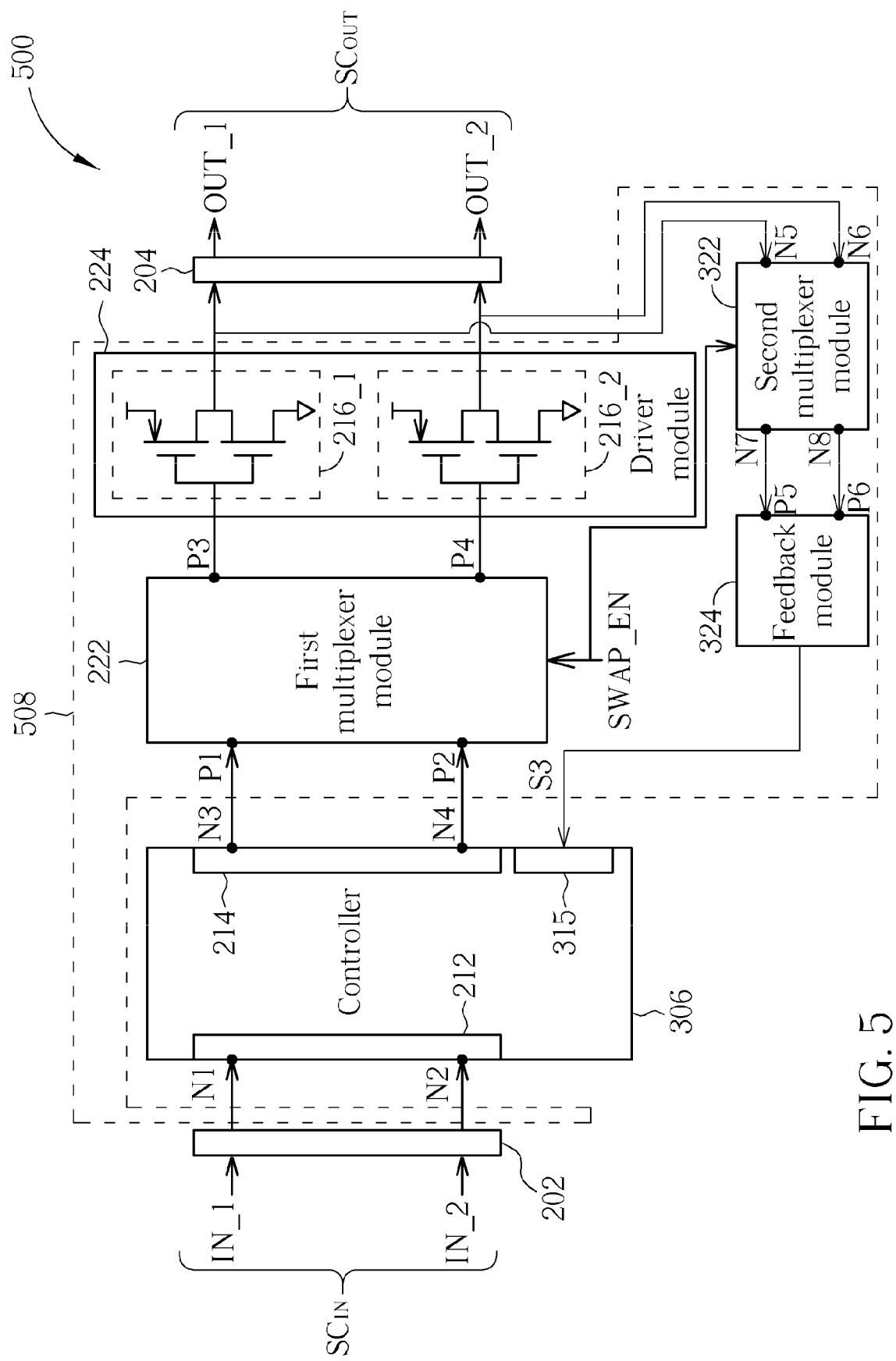
FIG. 5 is a diagram illustrating a fourth exemplary implementation of the controller chip shown in FIG. 1.

Please refer to FIG. 5, which is a diagram illustrating a fourth exemplary implementation of the controller chip 100 shown in FIG. 1. The structure of the controller chip 500 shown in FIG. 5 is similar to that of the controller chip 400 shown in FIG. 4. The major difference between them is that the signal processing circuit 508 further includes the second multiplexer 322 and the feedback module 324 as mentioned above. When the control setting SWAP_EN has the first logic level (e.g., "0"), the first output signal OUT_1 is fed into the input node P5 of the feedback module 324, and the second output signal OUT_2 is fed into the other input node P6 of the feedback module 324. Next, the feedback module 324 generates the motor feedback input S3 according to the received signals having the first polarity setting. When the control setting SWAP_EN has the second logic level (e.g., "1"), the first output signal OUT_1 is fed into the input node P6 of the feedback module 324, and the second output signal OUT_2 is fed into the other input node P5 of the feedback module 324. Next, the feedback module 324 generates the motor feedback input S3 according to the swapped signals having the second polarity setting which is different from the first polarity setting. To put it simply, with the control setting SWAP_EN properly set, the signal processing circuit 508 shown in FIG. 5 has a target interconnection configuration includes a target interconnection selected from the candidate first interconnections provided by the first multiplexer module 222 and a target interconnection selected from the candidate second interconnections provided by the second multiplexer module 322.

Figure 6:
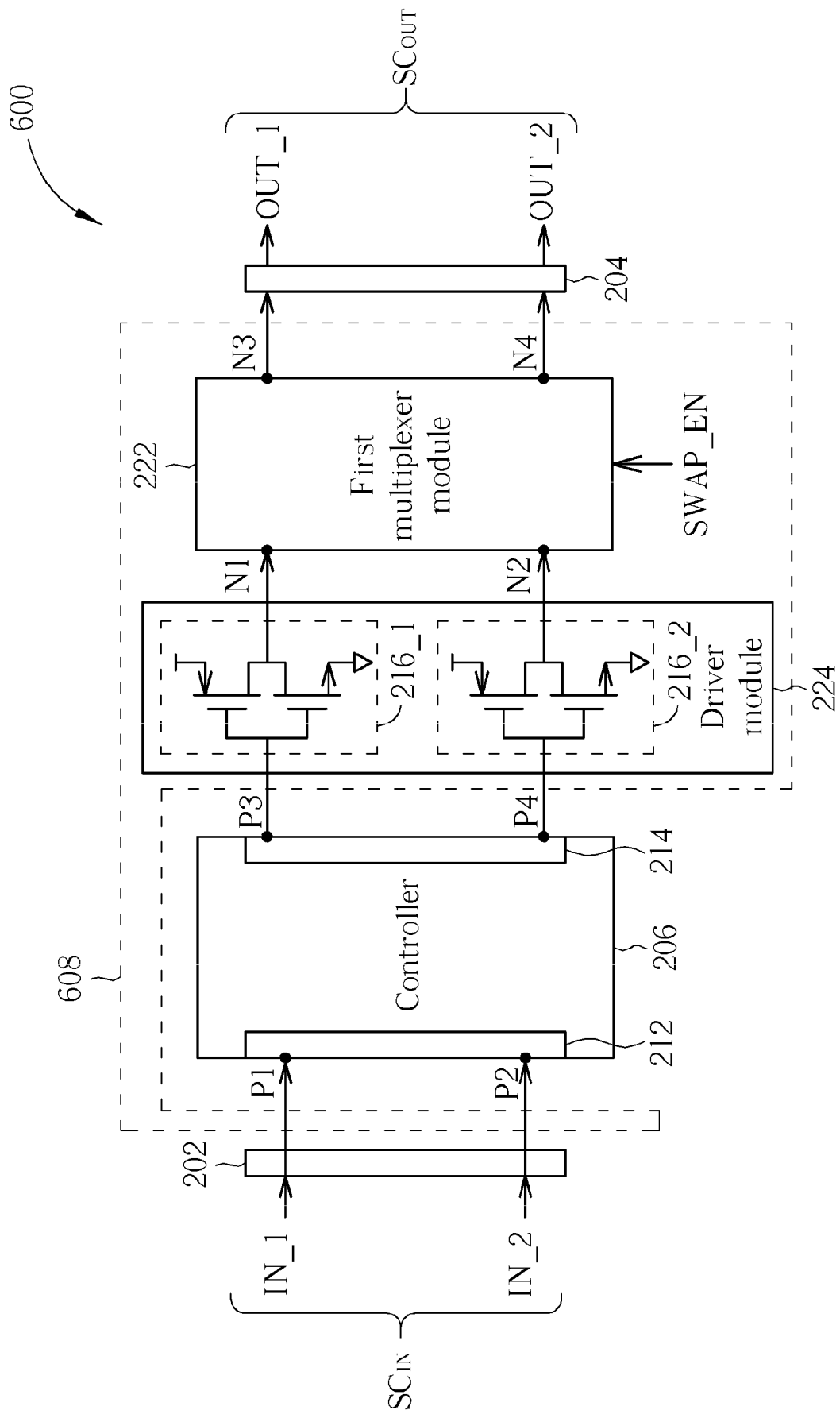
FIG. 6 is a diagram illustrating a fifth exemplary implementation of the controller chip shown in FIG. 1.

Please refer to FIG. 6, which is a diagram illustrating a fifth exemplary implementation of the controller chip 100 shown in FIG. 1. The difference between the controller chip 600 shown in FIG. 6 and the controller chip 200/400 shown in FIG. 2/FIG. 4 is the signal processing circuit design. As shown in FIG. 6, the signal processing circuit 608 has the first multiplexer module 222 disposed between the driver module 224 and the first output port 204 of the controller chip 600. In this exemplary implementation, the first multiplexer module 222 is arranged to provide a plurality of candidate first interconnections between the driver module 224 and the first output port 204. When the first multiplexer module 222 is controlled by the control setting SWAP_EN with the first logic level (e.g., "0") to have one candidate first interconnection, the input node N1 is electrically connected to the output node N3 for outputting an output of the first driving unit 216_1 as the first output signal OUT_1 of the motor control output $SC_{OUT}$, and the other input node N2 is electrically connected to the other output node N4 for outputting an output of the second driving unit 216_2 as the second output signal OUT_2 of the motor control output $SC_{OUT}$. When the first multiplexer module 222 is controlled by the control setting SWAP_EN with the second logic level (e.g., "1") to have another candidate first interconnection, the input node N1 is electrically connected to the output node N4 for outputting an output of the first driving unit 216_1 as the second output signal OUT_2 of the motor control output $SC_{OUT}$, and the other input node N2 is electrically connected to the other output node N3 for outputting an output of the second driving unit 216_2 as the first output signal OUT_1 of the motor control output $SC_{OUT}$.

Thus, the motor control output $SC_{OUT}$ has a first polarity setting for the first output signal OUT_1 and the second output signal OUT_2 included therein when the control setting SWAP_EN has the first logic level (e.g., "0"), and has a second polarity setting for the first output signal OUT_1 and the second output signal OUT_2 included therein when the control setting SWAP_EN has the second logic level (e.g., "1"). To put it simply, with the control setting SWAP_EN properly set, the signal processing circuit 608 in FIG. 6 has a target interconnection configuration includes a target interconnection selected from the candidate first interconnections provided by the first multiplexer module 222. Thus, by simply controlling the first multiplexer module 222 inside the controller chip 600, the polarity definition of signal outputs of the controller chip 600 can be easily configured to be consistent with the polarity definition of signal inputs of the motor device to be controlled.

Figure 7:
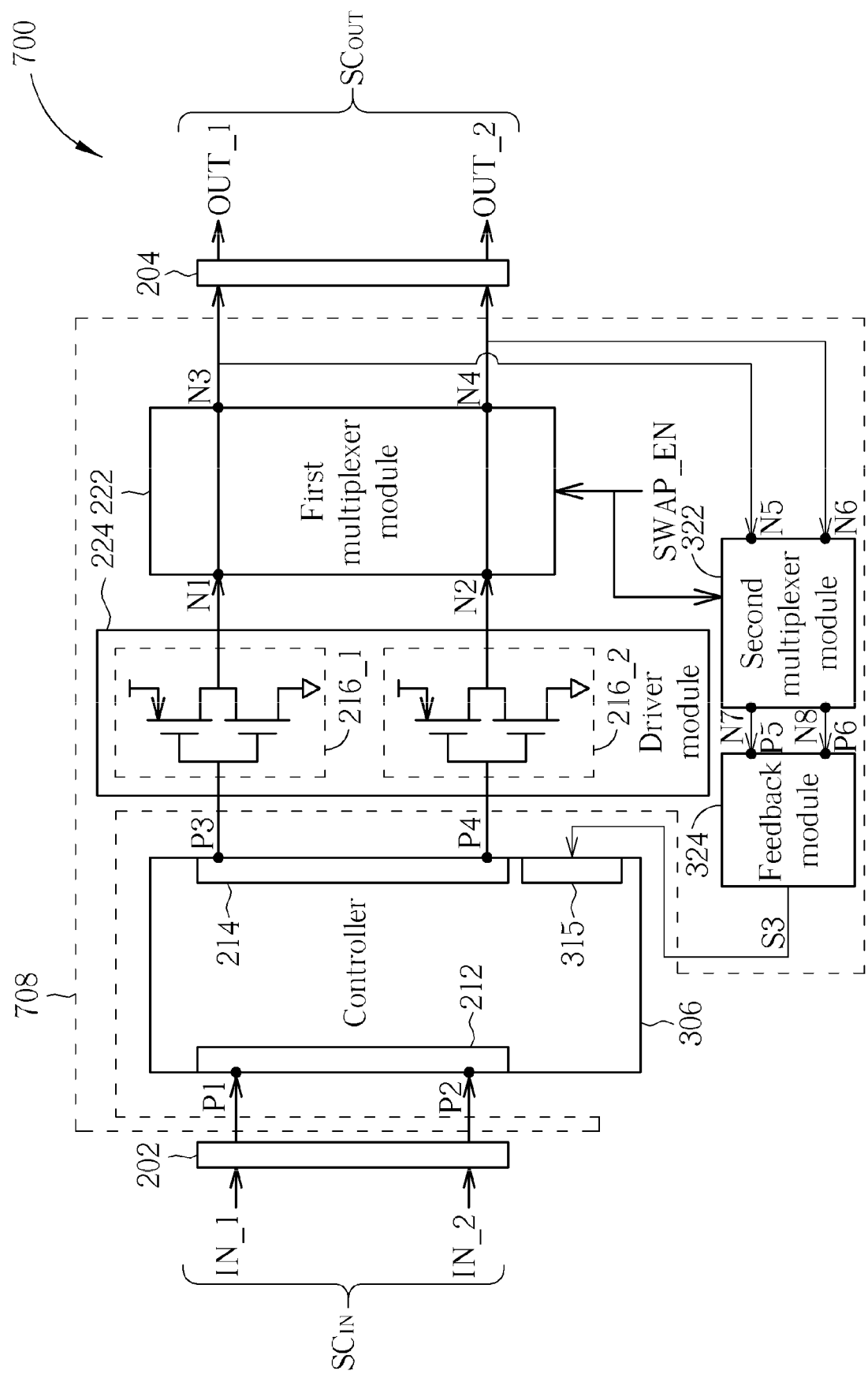
FIG. 7 is a diagram illustrating a sixth exemplary implementation of the controller chip shown in FIG. 1.

Please refer to FIG. 7, which is a diagram illustrating a sixth exemplary implementation of the controller chip 100 shown in FIG. 1. The structure of the controller chip 700 shown in FIG. 7 is similar to that of the controller chip 600 shown in FIG. 6. The major difference between them is that the signal processing circuit 708 further includes the second multiplexer 322 and the feedback module 324 as mentioned above. When the control setting SWAP_EN has the first logic level (e.g., "0"), the first output signal OUT_1 is fed into the input node P5 of the feedback module 324, and the second output signal OUT_2 is fed into the other input node P6 of the feedback module 324. Next, the feedback module 324 generates the motor feedback input S3 according to the received signals having the first polarity setting. When the control setting SWAP_EN has the second logic level (e.g., "1"), the first output signal OUT_1 is fed into the input node P6 of the feedback module 324, and the second output signal OUT_2 is fed into the other input node P5 of the feedback module 324. Next, the feedback module 324 generates the motor feedback input S3 according to the swapped signals having the second polarity setting which is different from the first polarity setting. To put it simply, with the control setting SWAP_EN properly set, the signal processing circuit 708 shown in FIG. 7 has a target interconnection configuration includes a target interconnection selected from the candidate first interconnections provided by the first multiplexer module 222 and a target interconnection selected from the candidate second interconnections provided by the second multiplexer module 322.

In the aforementioned exemplary implementations, the number of input signals included in the motor control input $SC_{IN}$ and the number of output signals included in the motor control output $SC_{OUT}$ are for illustrative purposes only, and are not meant to be limitations of the present invention. The number of input signals included in the motor control input $SC_{IN}$ and the number of output signals included in the motor control output $SC_{OUT}$ may be adjustable, depending actual design of the motor device 101 to be controlled. In addition, the actual implementation of the feedback module 324 is also adjustable, depending actual design of the motor device 101 to be controlled.

Taking a spindle motor implemented using a three-phase DC motor for example, the aforementioned feedback module 324 may be a back electro-motive force (BEMF) detector. Please refer to FIG. 8, which is a diagram illustrating a first exemplary implementation of the controller chip 500 shown in FIG. 5. The exemplary controller chip 800 has an input pin P_IN acting as the above-mentioned first input port and a plurality of output pins P_OUT1-P_OUT3 acting as the above-mentioned first output port. The controller 806 refers to a driver motor output signal DMO acting as the above-mentioned motor control input for generating three spindle motor control signals at output nodes P_U, P_V, and P_W, respectively. The driver module 823 drives the spindle motor 801 having three connection nodes U, V, and W according to the spindle motor control signals generated from the controller 806. The first multiplexer module 821 has a plurality of switches 825_1 and 825_2 implemented for controlling the polarity setting of the spindle motor control signals according to the control setting SWAP_EN.

For example, when the control setting SWAP_EN has the first logic level (e.g., "0"), the spindle motor control signal generated from the output node P_U is referenced by the driver module 823 to drive the connection node U of the spindle motor 801, and the spindle motor control signal generated from the output node P_V is referenced by the driver module 823 to drive the connection node V of the spindle motor 801. When the control setting SWAP_EN has the second logic level (e.g., "1"), the spindle motor control signal generated from the output node P_U is referenced by the driver module 823 to drive the connection node V of the spindle motor 801, and the spindle motor control signal generated from the output node P_V is referenced by the driver module 823 to drive the connection node U of the spindle motor 801. In other words, the first multiplexer module 821 performs signal swapping upon the spindle motor control signals generated from the output nodes P_U and P_V under the control of the control setting SWAP_EN. It should be noted that the spindle motor control signal generated from the output node P_W is referenced by the driver module 823 to drive the connection node W of the spindle motor 801 regardless of the logic level of the control setting SWAP_EN. Because of the inherent characteristic of the spindle motor 801 which is implemented using a three-phase DC motor, the swapping of the spindle motor control signals generated from the output nodes P_U and P_V would make the shaft of the spindle motor 801 change/reverse its rotational direction. Thus, with the first multiplexer module 821 properly set, the controller chip 800 is capable of controlling the shaft of the spindle motor 801 to rotate in a correct rotational direction.

Regarding the second multiplexer module 822 disposed at the feedback path, it similarly has a plurality of switches 826_1 and 826_2. When the control setting SWAP_EN has the first logic level (e.g., "0"), the spindle motor control signal transmitted through the output node P_OUT1 is fed back to an input node P_U' of the BEMF detector 824 which acts as the above-mentioned feedback module, and the spindle motor control signal transmitted through the output node P_OUT2 is fed back to an input node P_V' of the BEMF detector 824. When the control setting SWAP_EN has the second logic level (e.g., "1"), the spindle motor control signal transmitted through the output node P_OUT1 is fed back to the input node P_V' of the BEMF detector 824, and the spindle motor control signal transmitted through the output node P_OUT2 is fed back to the input node P_U' of the BEMF detector 824. Thus, the second multiplexer module 822 performs signal swapping upon the spindle motor control signals transmitted through the output nodes P_OUT1 and P_OUT2 under the control of the control setting SWAP_EN. It should be noted that the spindle motor control signal transmitted through the output node P_OUT3 is fed back to an input node P_W' of the BEMF detector 824 regardless of the logic level of the control setting SWAP_EN. The BEMF detector 824 is implemented to generate a motor feedback input to the controller 806 according to signals associated with the rotation of the spindle motor 801. As a person skilled in the art can readily understand details of the BEMF detector 824, further description is omitted here for brevity.

Figure 8:
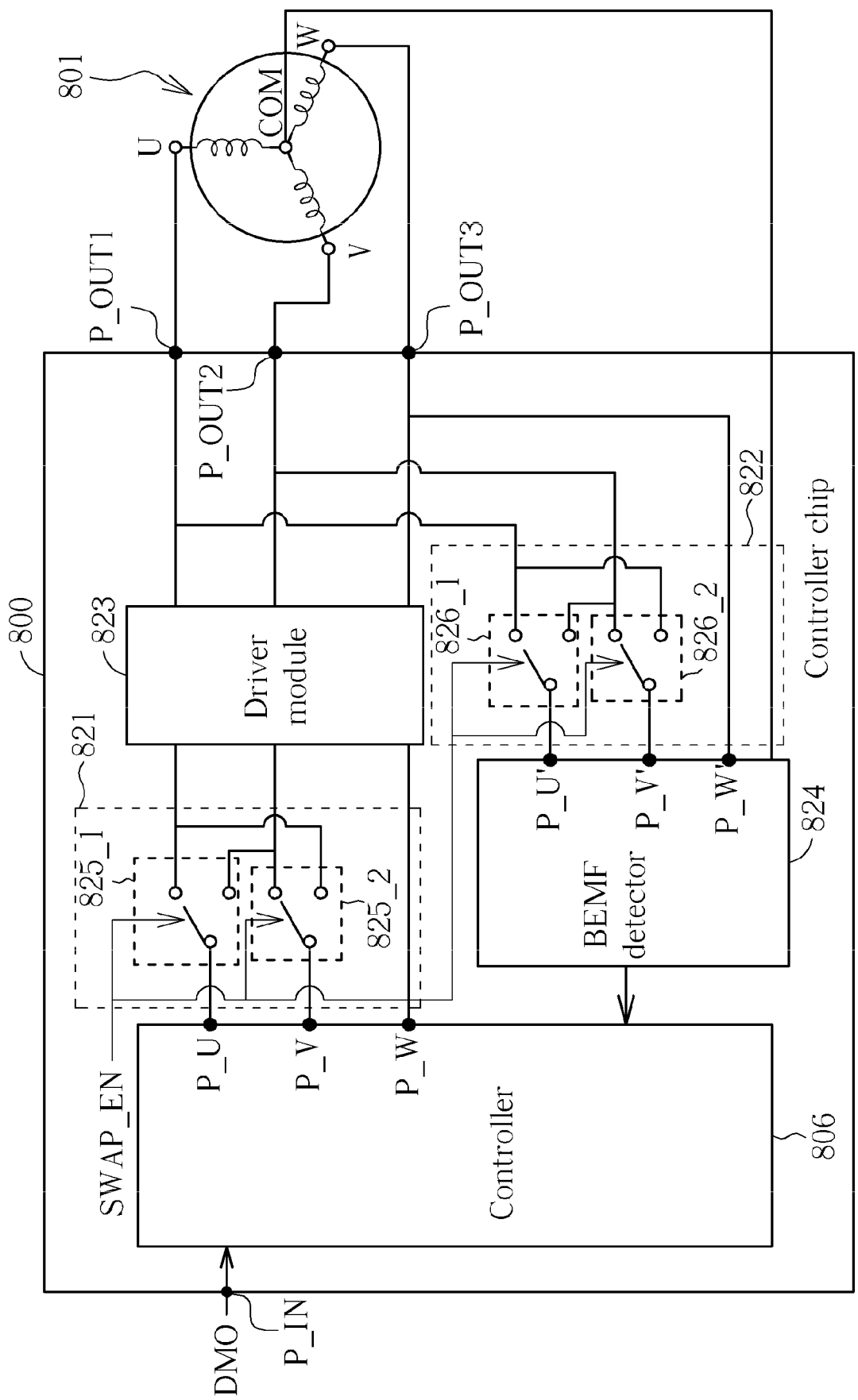
FIG. 8 is a diagram illustrating a first exemplary implementation of the controller chip shown in FIG. 5.
Figure 9:
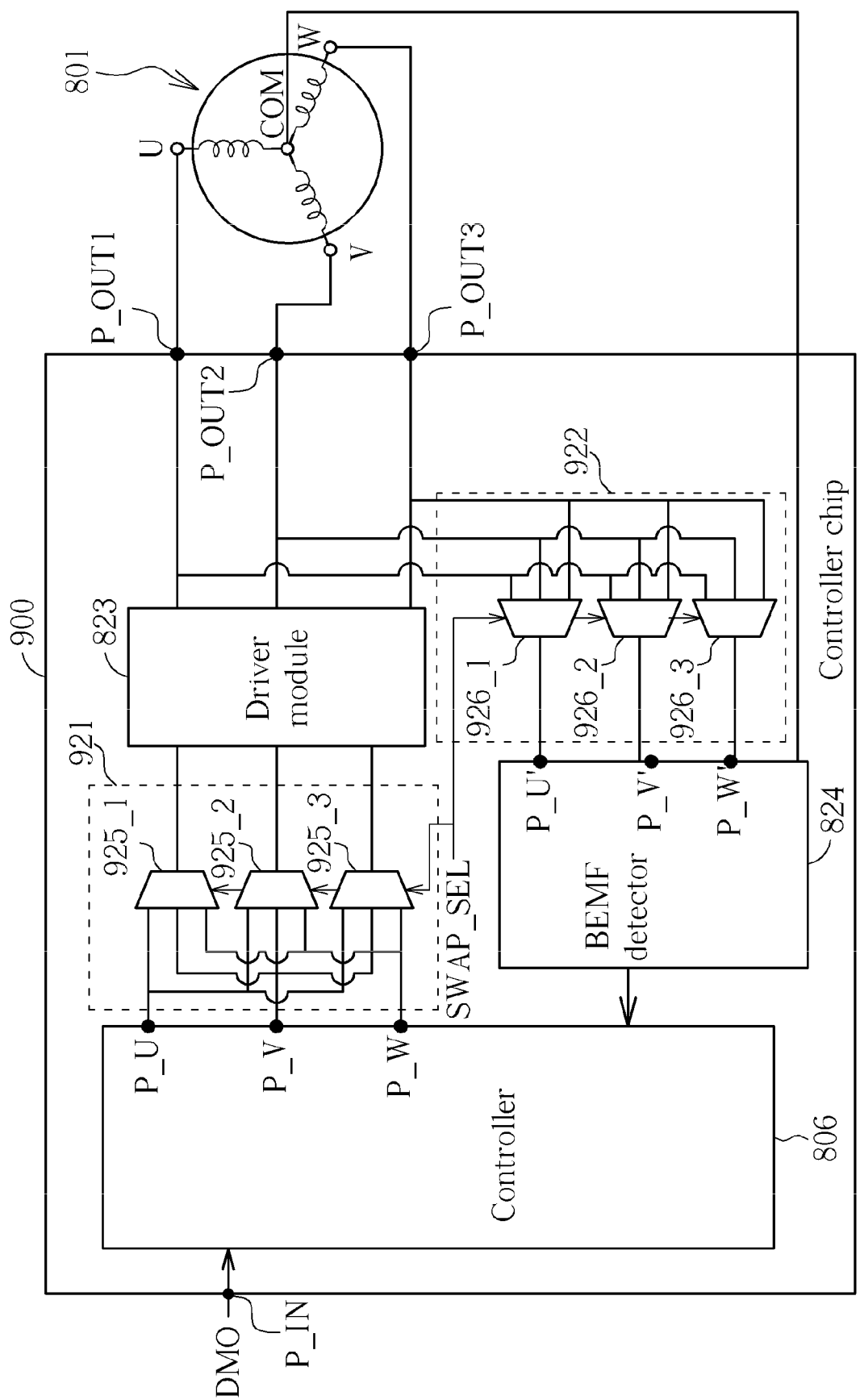
FIG. 9 is a diagram illustrating a second exemplary implementation of the controller chip shown in FIG. 5.

In the exemplary implementation shown in FIG. 8, the signal swapping operation is applied to the signals generated from nodes P_U and P_V of the controller 806 for changing the parity setting of the motor control output sent to the spindle motor 801. However, this is for illustrative purposes only. Please refer to FIG. 9, which is a diagram illustrating a second exemplary implementation of the controller chip 500 shown in FIG. 5. The structure of the controller chip 900 shown in FIG. 9 is similar to that of the controller chip 800 shown in FIG. 8. The major difference between them is that the controller chip 900 has a first multiplexer module 921 including a plurality of multiplexers (e.g., selectors) 925_1-925_3 included therein and a second multiplexer module 922 including a plurality of multiplexers (e.g., selectors) 926_1-926_3 included therein. As the spindle motor 801 is implemented using a three-phase DC motor, it will change/reverse the rotational direction when two of the signals received by the connection nodes U, V, and W are swapped.

In this exemplary implementation, the first multiplexer module 921 sets the interconnection between the controller 806 and the driver module 823 according to a control setting SWAP_SEL which includes control information for each of the multiplexers 925_1-925_3. That is, the control setting SWAP_SEL controls each of the multiplexers 925_1-925_3 to select one of the spindle motor control signals generated from nodes P_U, P_V, and P_W as its output, thereby determining the polarity setting of the motor control output sent to the spindle motor 801. In addition, the second multiplexer module 922 sets the interconnection between the BEMF detector 824 and the nodes P_OUT1-P_OUT3 according to the same control setting SWAP_SEL which includes control information for the multiplexers 926_1-926_3 respectively corresponding to the multiplexers 925_1-925_3. Therefore, the control setting SWAP_SEL controls each of the multiplexers 926_1-926_3 to select one of signals to be received by the connection nodes U, V, and W as its output. Compared to the controller chip 800 shown in FIG. 8, the controller chip 900 is more flexible in adjusting the polarity setting of the motor control output transmitted to the spindle motor 801.

Figure 10:
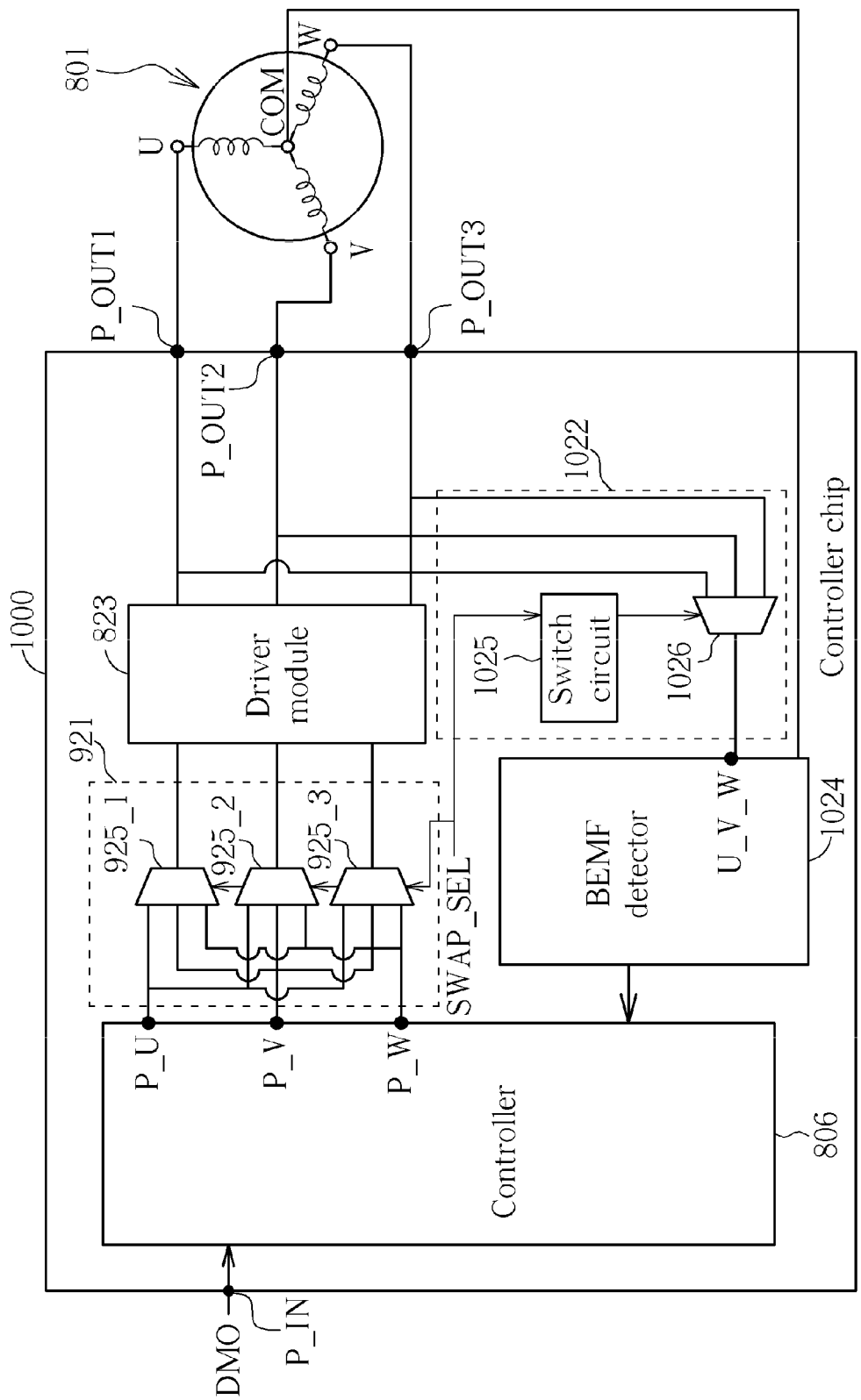
FIG. 10 is a diagram illustrating a third exemplary implementation of the controller chip shown in FIG. 5.

As can be seen from FIG. 9, the implementation of the second multiplexer module 922 requires many multiplexers, which increases the production cost inevitably. However, with proper control of the signal receiving sequence, the number of multiplexers implemented in the second multiplexer module 922 can be reduced. Please refer to FIG. 10, which is a diagram illustrating a third exemplary implementation of the controller chip 500 shown in FIG. 5. The structure of the controller chip 1000 shown in FIG. 10 is similar to that of the controller chip 900 shown in FIG. 9. The major difference between them is that the second multiplexer module 1022 has a switch circuit 1025 and a single multiplexer 1026. The switch circuit 1025 controls a signal receiving sequence of the multiplexer 1026. For example, in a case where the first multiplexer module 921 is controlled by the control setting SWAP_SEL to make the following driver module 823 drive the connection nodes U, V, and W by spindle motor control signals generated at the nodes P_U, P_V, and P_W, respectively, the switch circuit 1025 therefore controls the multiplexer 1026 to sequentially output the signals used to drive the connection nodes U, W, and V to the node U_V_W of the BEMF detector 1024 in a cyclic manner. The signal receiving sequence of the multiplexer 1026 may be expressed as follows: U→W→V→U→W→V. In another case where the first multiplexer module 921 is controlled by the control setting SWAP_SEL to make the following driver module 823 drive the connection nodes U, V, and W by spindle motor control signals generated at the nodes P_U, P_W, and P_V, respectively, the switch circuit 1025 controls the multiplexer 1026 to sequentially output the signals used to drive the connection nodes U, V, and W to the node U_V_W of the BEMF detector 1024 in a cyclic manner. The signal receiving sequence of the multiplexer 1026 may be expressed as follows: U→V→W→U→V→W. The same objective of providing the BEMF detector 824 with signals needed for generating the motor feedback input is achieved.

The exemplary controller chip implementations shown in FIG. 8-FIG. 10 are all based on the same structure shown in FIG. 5. However, this is for illustrative purposes only. The technical features directed to BEMF detector 824, the first multiplexer module 821/921 and the second multiplexer module 822/922/1022 may be employed in a controller chip using the structure shown in FIG. 3 or FIG. 7. Moreover, the first multiplexer module 821/921 and/or the second multiplexer module 822/922/1022 may be realized using hardware, software, or a combination thereof. These alternative designs all obey the spirit of the present invention and fall within the scope of the present invention.

Figure 11:
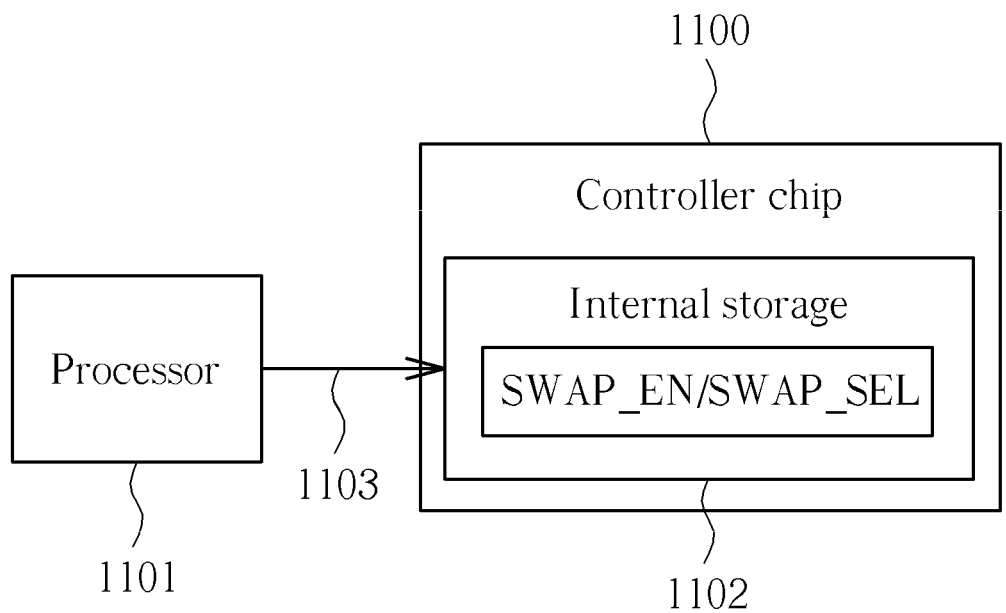
FIG. 11 is a diagram illustrating a first exemplary embodiment of providing the control setting used for controlling multiplexer modules.
Figure 12:
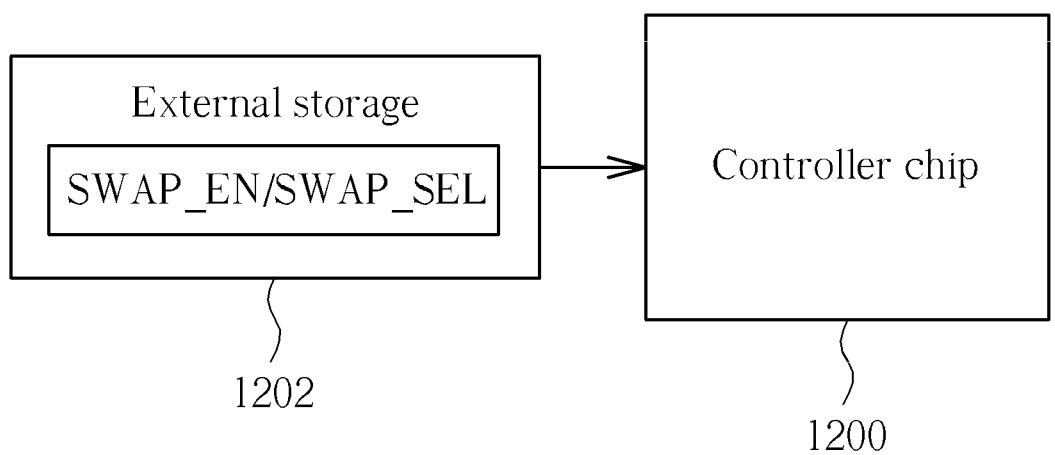
FIG. 12 is a diagram illustrating a second exemplary embodiment of providing the control setting used for controlling multiplexer modules.
Figure 13:
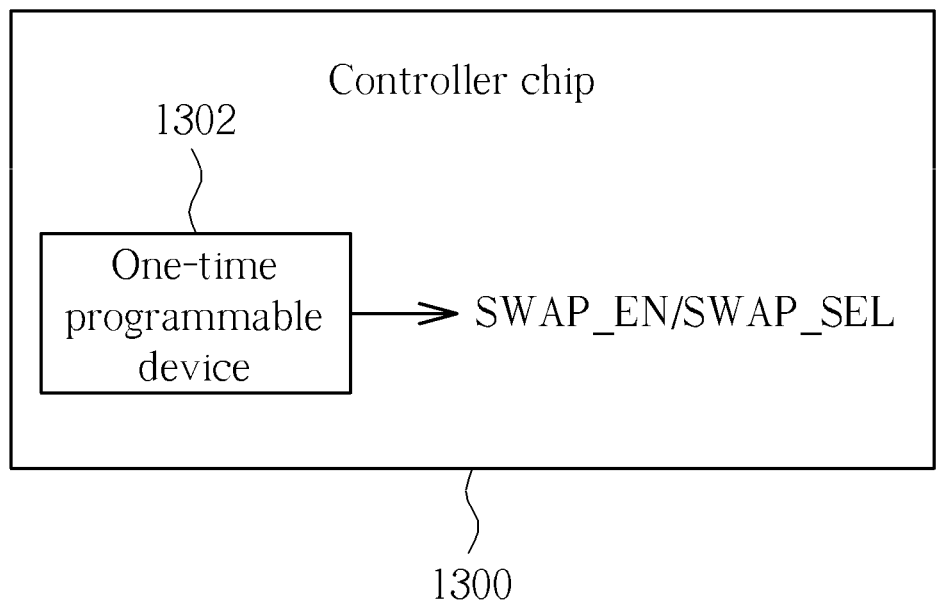
FIG. 13 is a diagram illustrating a third exemplary embodiment of providing the control setting used for controlling multiplexer modules.
Figure 14:
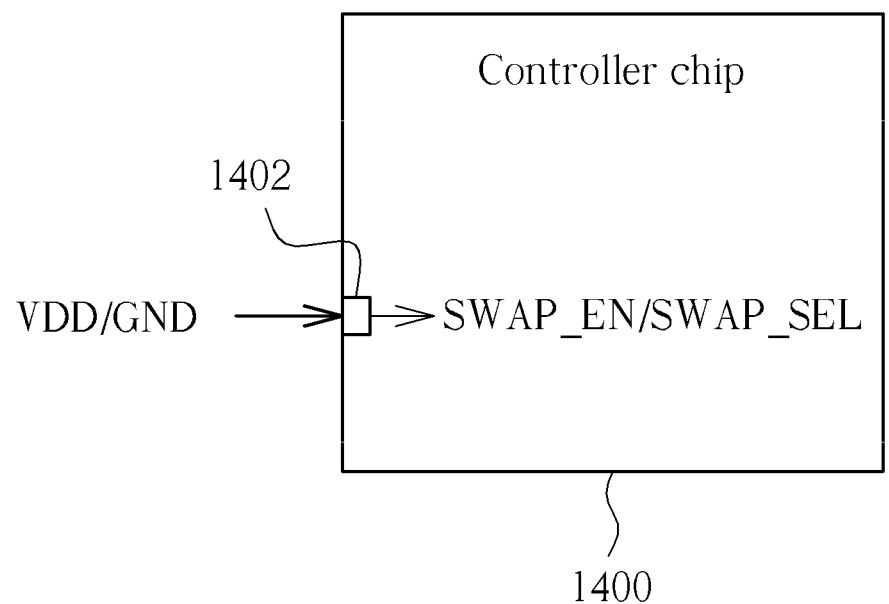
FIG. 14 is a diagram illustrating a fourth exemplary embodiment of providing the control setting used for controlling multiplexer modules.

FIG. 11-FIG. 14 are diagrams illustrating exemplary embodiments of providing the control setting SWAP_EN/SWAP_SEL mentioned above. As shown in FIG. 11, the control setting SWAP_EN/SWAP_SEL is provided by an internal storage 1102 of a controller chip 1100. By way of example, but not limitation, the internal storage 1102 may be a register device or a flash device, and the stored control setting SWAP_EN/SWAP_SEL stored in the internal storage 1102 may be set by an external processor 1101 such as a microprocessor or a digital signal processor (DSP). The bus 1103 coupled between the external processor 1101 and the controller chip 110 may be a serial bus or other data transmission bus. As shown in FIG. 12, the control setting SWAP_EN/SWAP_SEL is provided by an external storage 1202 of a controller chip 1200. For example, the external storage 1202 may be a flash device. As shown in FIG. 13, the control setting SWAP_EN/SWAP_SEL is provided by a one-time programmable device 1302 within a controller chip 1300. For example, the one-time programmable device 1302 may be a fuse. As shown in FIG. 14, the control setting SWAP_EN/SWAP_SEL is provided by an external pin 1402 of a controller chip 1400. For example, the external pin 1402 may be electrically connected to a reference voltage (e.g., a power supply voltage VDD or a ground voltage GND) for configuring the control setting SWAP_EN/SWAP_SEL.

The signal processing circuit in the controller chip may switch from a first interconnection configuration to a second interconnection configuration according to the control setting SWAP_EN/SWAP_SEL. In this way, one pin originally used for transmitting a first output signal to the motor device is used for transmitting a second output signal to the motor device, and another pin originally used for transmitting the second output signal to the motor device is used for transmitting the first output signal to the motor device. To put it another way, a pin assignment of the controller chip is adjusted due to the internal signal swapping operation performed by the signal processing circuit included in the controller chip. Therefore, an exemplary method of controlling a motor device can be briefly summarized by following steps: reading a control setting of a pin assignment of a controller chip, adjusting the pin assignment of the controller chip according to the control setting, and generating a motor control output to the motor device by utilizing the controller chip with the adjusted pin assignment. In addition, the step of reading the control setting of the pin assignment of the controller chip may be realized by reading the control setting through an internal storage in the controller chip, an external storage of the controller chip, a one-time programmable device in the controller chip, or an external pin of the controller chip.

Briefly summarized, the exemplary controller chip of the present invention is capable of adjusting the polarity setting of motor control signals sent to the motor device and thus requires no additional modification made to signal traces routed on the PCB. Moreover, as the controller chip is properly designed to have the signal swapping performed internally, the layout design of the PCB on which the controller chip is mounted can be simplified.

Those skilled in the art will readily observe that numerous modifications and alterations of the device and method may be made while retaining the teachings of the invention.

What is claimed is:

1. A controller chip for controlling a motor device, comprising:
   a first input port, arranged to receive a motor control input;
   a first output port, arranged to generate a motor control output;
   a controller, arranged to generate an output signal according to an input signal, the controller having a second input port for receiving the input signal and a second output port for outputting the output signal, wherein the input signal is derived from the motor control input, and the motor control output is derived from the output signal; and
   a signal processing circuit, arranged to have a target interconnection configuration selected from a plurality of candidate interconnection configurations each including an interconnection between the first input port and the second input port and an interconnection between the first output port and the second output port.

2. The controller chip of claim 1, wherein the signal processing circuit comprises:
   a first multiplexer module, arranged to provide a plurality of candidate first interconnections between the first input port and the second input port, wherein the target interconnection configuration includes a target interconnection selected from the candidate first interconnections.

3. The controller chip of claim 2, wherein the controller further has a third input port arranged to receive a motor feedback input, and the signal processing circuit further comprises:
   a driver module, coupled between the first output port and the second output port, for generating the motor control output according to the output signal of the controller;
   a feedback module, coupled to the third input port, for generating the motor feedback input according to the motor control output; and
   a second multiplexer module, arranged to provide a plurality of candidate second interconnections between the feedback module and the first output port, wherein the target interconnection configuration further includes a target interconnection selected from the candidate second interconnections.

4. The controller chip of claim 1, wherein the signal processing circuit comprises:
   a driver module, coupled to the first output port, for generating the motor control output according to the output signal of the controller; and
   a first multiplexer module, arranged to provide a plurality of candidate first interconnections between the second output port and the driver module, wherein the target interconnection configuration includes a target interconnection selected from the candidate first interconnections.

5. The controller chip of claim 4, wherein the controller further has a third input port arranged to receive a motor feedback input, and the signal processing circuit further comprises:

a feedback module, coupled to the third input port, for generating the motor feedback input according to the motor control output; and a second multiplexer module, arranged to provide a plurality of candidate second interconnections between the feedback module and the first output port, wherein the target interconnection configuration further includes a target interconnection selected from the candidate second interconnections.

6. The controller chip of claim 1, wherein the signal processing circuit comprises:

a driver module, coupled to the second output port, for generating the motor control output according to the output signal of the controller; and a first multiplexer module, arranged to provide a plurality of candidate first interconnections between the first output port and the driver module, wherein the target interconnection configuration includes a target interconnection selected from the candidate first interconnections.

7. The controller chip of claim 6, wherein the controller further has a third input port arranged to receive a motor feedback input, and the signal processing circuit further comprises:

a feedback module, coupled to the third input port, for generating the motor feedback input according to the motor control output; and a second multiplexer module, arranged to provide a plurality of candidate second interconnections between the feedback module and the first output port, wherein the target interconnection configuration further includes a target interconnection selected from the candidate second interconnections.

8. The controller chip of claim 1, wherein the motor device controlled by the controller chip is a focus actuator, a tracking actuator, a tilt actuator, a stepping motor, or a spindle motor employed in an optical storage apparatus.

9. A controller chip for controlling a motor device, comprising:

a first input port, arranged to receive a motor control input;

a first output port, arranged to generate a motor control output;

a controller, arranged to generate an output signal according to an input signal, the controller having a second input port for receiving the input signal and a second output port for outputting the output signal, wherein the input signal is derived from the motor control input, and the motor control output is derived from the output signal; and a signal processing circuit, arranged to switch from a first interconnection configuration to a second interconnection configuration, wherein each of the first interconnection configuration and the second interconnection configuration includes an interconnection between the first input port and the second input port and an interconnection between the first output port and the second output port.

10. The controller chip of claim 9, wherein the signal processing circuit comprises:

a first multiplexer module, arranged to have a first interconnection between the first input port and the second input port switched to a second interconnection between the first input port and the second input port, wherein the first interconnection configuration includes the first interconnection, and the second interconnection configuration includes the second interconnection.

11. The controller chip of claim 10, wherein the controller further has a third input port arranged to receive a motor feedback input, and the signal processing circuit further comprises:

a driver module, coupled between the first output port and the second output port, for generating the motor control output according to the output signal of the controller;

a feedback module, coupled to the third input port, for generating the motor feedback input according to the motor control output; and a second multiplexer module, arranged to have a third interconnection between the feedback module and the first output port switched to a fourth interconnection between the feedback module and the first output port, wherein the first interconnection configuration further includes the third interconnection, and the second interconnection configuration further includes the fourth interconnection.

12. The controller chip of claim 9, wherein the signal processing circuit comprises:

a driver module, coupled to the first output port, for generating the motor control output according to the output signal of the controller; and a first multiplexer module, arranged to have a first interconnection between the second output port and the driver module switched to a second interconnection between the second output port and the driver module, wherein the first interconnection configuration includes the first interconnection, and the second interconnection configuration includes the second interconnection.

13. The controller chip of claim 12, wherein the controller further has a third input port arranged to receive a motor feedback input, and the signal processing circuit further comprises:

a feedback module, coupled to the third input port, for generating the motor feedback input according to the motor control output; and a second multiplexer module, arranged to have a third interconnection between the feedback module and the first output port switched to a fourth interconnection between the feedback module and the first output port, wherein the first interconnection configuration further includes the third interconnection, and the second interconnection configuration further includes the fourth interconnection.

14. The controller chip of claim 9, wherein the signal processing circuit comprises:

a driver module, coupled to the second output port, for generating the motor control output according to the output signal of the controller; and a first multiplexer module, arranged to have a first interconnection between the first output port and the driver module switched to a second interconnection between the first output port and the driver module, wherein the first interconnection configuration includes the first interconnection, and the second interconnection configuration includes the second interconnection.

15. The controller chip of claim 14, wherein the controller further has a third input port arranged to receive a motor feedback input, and the signal processing circuit further comprises:

a feedback module, coupled to the third input port, for generating the motor feedback input according to the motor control output; and a second multiplexer module, arranged to have a third interconnection between the feedback module and the first output port switched to a fourth interconnection between the feedback module and the first output port, wherein the first interconnection configuration further includes the third interconnection, and the fourth interconnection configuration further includes the fourth interconnection.

16. The controller chip of claim 9, wherein the motor device controlled by the controller chip is a focus actuator, a tracking actuator, a tilt actuator, a stepping motor, or a spindle motor employed in an optical storage apparatus.

17. A method of controlling a motor device, comprising:
   reading a control setting of a pin assignment of a controller chip through an internal storage in the controller chip, an external storage of the controller chip, a one-time programmable device in the controller chip, or a pin of the controller chip;
   adjusting the pin assignment of the controller chip according to the control setting; and
   generating a motor control output to the motor device by utilizing the controller chip with the adjusted pin assignment.

18. The method of claim 17, wherein the motor device controlled by the controller chip is a focus actuator, a tracking actuator, a tilt actuator, a stepping motor, or a spindle motor disposed in an optical storage apparatus.

* * * * *